United States Patent [19]

Garvey et al.

[11] Patent Number: 4,844,015

[45] Date of Patent: Jul. 4, 1989

[54] ARTIFICIAL OYSTER CULTCH

[75] Inventors: Margaret M. Garvey, Philadelphia, Pa.; Kent S. Price, Jr., Lewes, Del.

[73] Assignee: University of Delaware, Newark, Del.

[21] Appl. No.: 122,309

[22] Filed: Nov. 18, 1987

[51] Int. Cl.⁴ .................................. A01K 61/00
[52] U.S. Cl. ........................................... 119/4
[58] Field of Search ...................... 119/2, 3, 4; 106/DIG. 1, 405

[56] References Cited

U.S. PATENT DOCUMENTS

| 385,161 | 6/1988 | Beach | 119/4 |
|---|---|---|---|
| 2,987,408 | 6/1961 | Minnick | 106/405 X |
| 3,294,061 | 12/1966 | Hanks | 119/4 |
| 3,455,278 | 7/1969 | Hunt | 119/4 |
| 3,552,357 | 1/1971 | Quayle et al. | 119/4 |
| 3,572,292 | 3/1971 | Quayle et al. | 119/4 |
| 4,177,759 | 12/1977 | Maheo | 119/4 |
| 4,212,682 | 7/1980 | Burkett | 106/405 |

FOREIGN PATENT DOCUMENTS

| 212729 | 8/1984 | Denmark | 106/405 |
|---|---|---|---|
| 899505 | 1/1982 | U.S.S.R. | 106/405 |

Primary Examiner—Gene Mancene
Assistant Examiner—R. Thomas Price
Attorney, Agent, or Firm—James H. Ryan

[57] ABSTRACT

Described is an oyster cultch made from coal-ash wastes substantially as effective as the natural oyster-shell cultch.

14 Claims, 1 Drawing Sheet

ARTIFICIAL OYSTER CULTCH

BACKGROUND OF THE INVENTION

1. Field of Invention

This invention relates to, and has as its principal object provision of, a novel cultch, or growth medium, for oysters or other molluscs made from the wastes left by burning coal in bulk as in power plants.

2. Prior Art

Artificial oyster cultches have been made from various materials. Clark et al., U.S. Pat. No. 3,552,357 (1971), for example, show use of hydraulic cement, lime, an antislime lubricant, gypsum, and a fiber-binding material. So far, as is known, however, cultch has not been made from coal wastes.

THE DRAWINGS

The invention will be understood in physical aspect from the drawings, in which.

Figure 2:
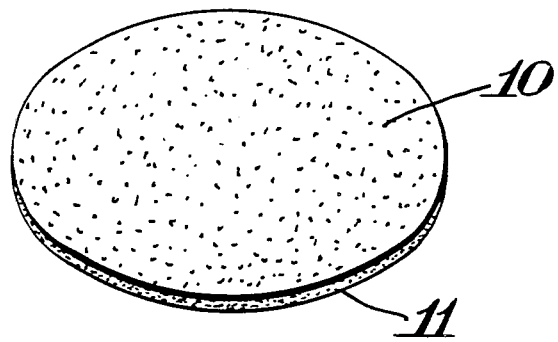
FIG. 2 is a pictorial view of a disk with surfaces 10 and 11 also usable as cultch.
Figure 1:
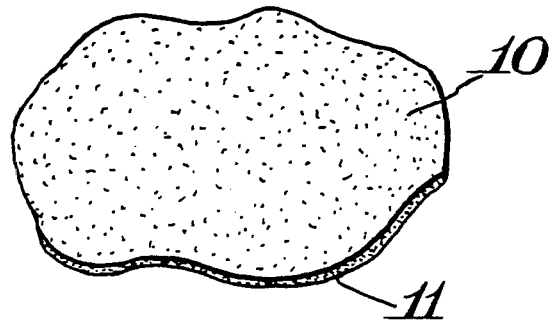
FIG. 1 is a pictorial view of a flat irregularly shaped object with two surfaces, 10 and 11, perferably rough, usable as cultch.
Figure 3:
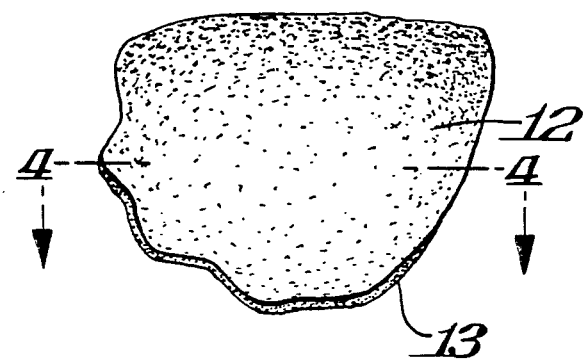
Figure 4:
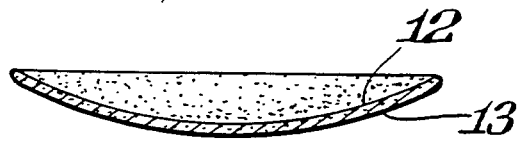

FIG. 3 is a pictorial view of the preferred cultch in the form, and approximately the weight, of a natural oyster shell with a concave surface 12, preferred by oyster spat, and a convex surface 13; and FIG. 4 is a cross-sectional and side-elevational view along line 4—4 of the embodiment shown in FIG. 3.

DESCRIPTION OF THE INVENTION

In accordance with the present invention, cultch is made in a desired shape from wastes from the combustion of coal. These wastes occur in three types: flue gas desulfurization sludge (FGD), fly ash (FA), and bottom ash (BA). A large volume of flue gas desulphurization sludge, a waste material composed primarily of calcium sulfate and calcium sulfite, results from the use of desulfurization scrubbers in coal-fired power plants. Fly ash is a dust which rises and is filtered out of coal combustion gases. Bottom ash is the gravelly residue left on the floor of the furnace. Lime kiln dust (LKD), a by-product of lime processing, or cement can also be used in the mixtures up to about 20% by weight.

Three mixtures, all of materials from commercial power plants (except LKD), were tested as cultch, and concrete (Mix 4) and natural oyster shells (Mix 5) were used as controls. The three novel mixes were:

Mix 1—FA, FGD and high calcium quicklime at a ratio of 58:38:4;

Mix 2—FA and LKD at a ratio of 85:15; and

Mix 3—BA, FA, and LKD at a ratio of 54:28:18.

The necessity for binders depends on the chemical composition of various ashes. Some have a sufficiently high calcium and magnesium content as to be self cementing. In any case, about 10% cement will provide sufficient binding. Compaction will aid in the cementing process but may not substitute for binders in lower calcium/magnesium ashes.

To prepare the mixtures, the materials are merely mixed and allowed to set as with concrete. Shaping in the form of oyster shells can be by molding before setting takes place.

Analysis of experimental data such as that given below indicates that all ratios of coal ash are suitable for making oyster cultch but that Mix 3, i.e., a mix containing both fly ash and bottom ash as well as up to about 20% of lime kiln dust, is preferred by the oysters, the response being approximately equal to that of the natural oyster shell control (Mix 5).

Use of coal ash wastes for cultch provides at least a partial answer to two problems. It provides a cheap source of cultch itself, important in oyster-growing areas such as the Chesapeake Bay region. Furthermore, it provides a method of disposal for coal wastes, an environmental problem for the electric power industry. Moreover, in rate of growth of oysters, the present cultch is superior to the rate on natural oyster shells.

Coal ash-waste cultch also has certain advantages over concrete cultch. For example, dark coloration of the coal-waste cultch is attractive to oyster larvae because they are negatively phototropic, i.e., are attracted to dark places. More important, probably, is the fact that oyster larvae prefer rough/pitted surfaces. Mix 3 is best here because of the granular nature of the bottom ash. Finally, oyster larvae are probably also attracted to ash because of the high calcium and magnesium content of the material used by the oyster in building its shell.

EXAMPLE

As an example illustrating the invention is as follows:

Larvae were produced in the laboratory utilizing the methodology described by Ewart (Support Activities-Hatchery, pp. 87–97, in E. T. Bolton (Ed.) Intensive Marine Bivalve Cultivation in a Controlled Recirculating Seawater Prototype System DEL-SG-07-82). When larvae developed eyespots (i.e. generally ready to set in 24–48 hours), they were transferred at a density of 1.5 larvae/ml to a setting/growout tank containing various substrata. In total, 1,200,000 larvae were equally divided between two 400 L tanks with dimensions of 94 cm long×75 cm wide×64 cm deep.

Five different substrata were available for spat set, as noted above. Mixes 1–4 were used as disks 15.2 cm in diameter by 5.1 cm thick. Mix 5 consisted of eight to ten whole oyster shells stacked on top of each other so as to approximate, as closely as possible, the dimensions of Mixes 1–4.

To determine whether substratum age influences setting, Mixes 1–4 were soaked in seawater for 39 days, eight days, or zero days prior to addition of larvae. Individual disks were assigned to an aging group by random sampling. Each of three aging conditions was examined in quadruplicate. All five substrata were encircled with a 1.75 inch thick section of polyvinyl chloride pipe and secured with nylon wire ties to plastic trays. The trays allowed exposure of both sides of the substrata to larvae. Each of the two tanks initially contained 12 trays, vertically positioned, for a total of 24 trays. Various substrate types were arranged in sequential fashion so that position effects were normalized for each of the four replicate trays.

Starting one week after larvae had been added to the tank, the height of oysters, taken as the distance from hinge to bill, was measured to the nearest millimeter. Oysters growing on both sides of mixes 1–5 were measured at two-week intervals for 11 weeks, and four-week intervals thereafter for 16 additional weeks. The total number of oysters present on both sides of each substratum was tallied concurrently.

Approximately three weeks after setting, when an average size of 4–6 mm in height was obtained, one-half of the oysters were transferred to the field. Trays were suspended in a modular form from a raft floating at the mouth of the Broadkill River (Delaware). Laboratory oysters were maintained for six months after setting while the field portion of the experiment was run for seven weeks postset. Extensive fouling made it necessary to terminate the field component of the study at that time as the tremendous tunicate and bryozoan population threatened to smother underlying oysters.

Young oysters were maintained in the laboratory in seawater at 30% and 23°–25° C. Water was filtered in order to provide a relatively homogeneous environment. Tanks were constantly aerated so that dissolved oxygen concentration was around 6.50 mg/l. This value is comparable to the 6.95 mg/l oxygen solubility value for saturated water at 25° C. and 30%. Tank water was changed two to three times a week. Diet consisted of combinations of four algal species: *Isochrysis galbana, Thalossiosira pseudonana, Chaetoceros gracile,* and Va-52, a small green flagellate of unidentified species. The amount of algae the oysters received each day ranged from $1 \times 10^{10}$ to $11 \times 10^{10}$ cells per tank, depending on the availability of algae at any given time. Based on the presence of a faint tinge of algae in the tank 24 hours after feeding, $2-3 \times 10^{11}$ cells per tank was initially necessary for growing oysters to feed in excess.

At the termination of laboratory and field experiments, oysters were measured, scraped free of substrata, pooled by aging and growout conditions with oysters grown on the same mix, and placed in plastic bags for freezing. Upon thawing, the entire visceral mass, including adductor muscle, was removed with a plastic untensil and weighed. When possible, enough oysters were opened to obtain 10–12 g of wet tissue in order to have a 1–2 g dry weight sample for determination of metal concentration. The remaining oysters were left intact and wet weight obtained for later determinations of condition index. Where there were not enough oysters in a pooled quandruplicate sample to obtain the 10–12 g wet-tissue weight, tissue was removed from all but two or three oysters. This tissue was then further pooled with other underweight samples of similar aging and/or growout conditions. The two or three remaining oysters were used in condition index analyses as before. The two condition parameters analyzed were the ratio:

(dry soft tissue (g)/dry shell weight (g))$\times 1000$ and percent organic content. The ash weight was converted to percent organics by the formula:

(total dry weight (g)−total ash weight (g)/total dry weight (g))$\times 100$.

From analysis of the data obtained experimentally, it was concluded that:

1. There is a setting preference by oyster larvae for a coal waste mixture of bottom ash and lime kiln dust approximately equaling that for oyster shell, the natural cultch material.
2. Significant mortality occured only on Mix 2 in laboratory cultures.
3. Oysters growing in control Mix 5 (oyster shell) had a significantly slower rate of growth than those on the other substrata, and rate of growth was significantly greater for oysters grown in the field.

Having described our invention,

We claim:

1. Cultch for mollusca formed from coal waste mixed with not more than about 20% by weight of a binder material.
2. The cultch of claim 1 formed from fly ash, flue gas desulfurization sludge and quicklime.
3. The cultch of claim 1 formed from fly ash and lime kiln dust.
4. The cultch of claim 1 formed from bottom ash, flue ash and lime kiln dust.
5. The cultch of claim 1 in the shape of a disk.
6. The cultch of claim 1 having a roughened surface.
7. The cultch of claim 1 having at least one concave surface.
8. The cultch of claim 7 having a roughened surface.
9. The cultch of claim 1 in the shape of a natural oyster shell.
10. The cultch of claim 9 having a roughened surface.
11. A cultch of claim 1 having live oysters attached thereto.
12. A cultch of claim 2 having live oysters attached thereto.
13. A cultch of claim 3 having live oysters attached thereto.
14. A cultch of claim 4 having live oysters attached thereto.

* * * * *